(No Model.)
T. LACKLIN.
STRADDLE ROW PLOW OR CULTIVATOR.
No. 365,609. Patented June 28, 1887.
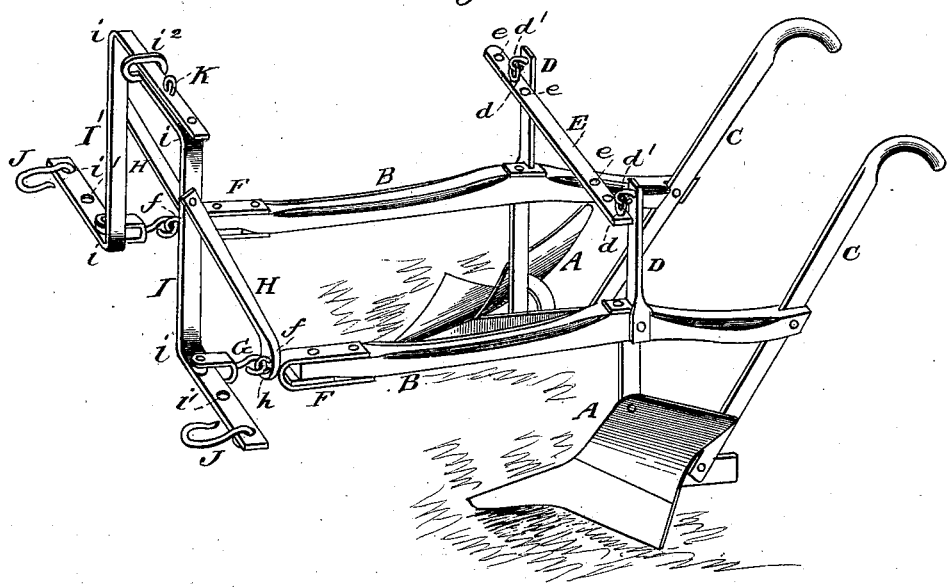
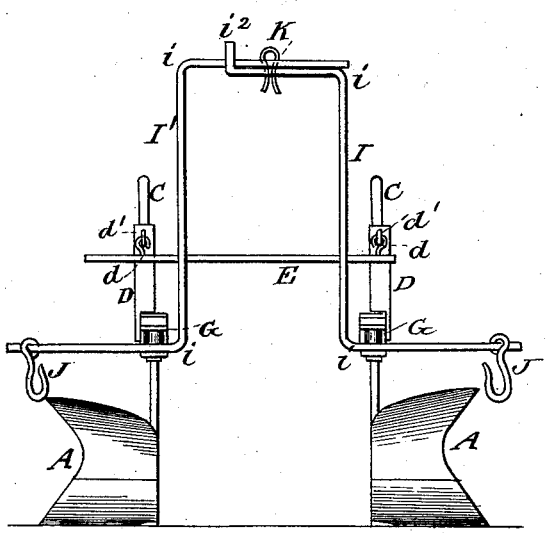
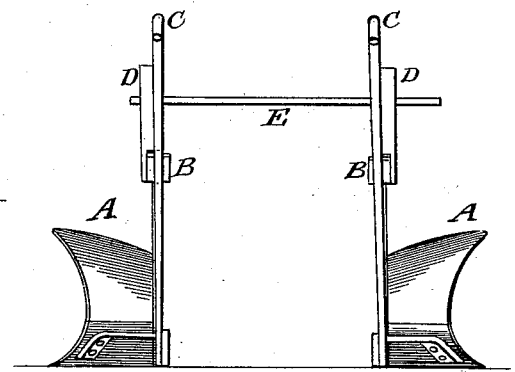
Witnesses.
A. Ruppert
W. Burris
Inventor:
Thomas Lacklin,
Per
Thomas P. Simpson,
atty.

UNITED STATES PATENT OFFICE.

THOMAS LACKLIN, OF TRUXTON, MISSOURI.

STRADDLE-ROW PLOW OR CULTIVATOR.

SPECIFICATION forming part of Letters Patent No. 365,609, dated June 28, 1887.

Application filed April 15, 1887. Serial No. 234,947. (No model.)

*To all whom it may concern:*

Be it known that I, THOMAS LACKLIN, a citizen of the United States, residing at Truxton, in the county of Lincoln and State of Missouri, have invented certain new and useful Improvements in Straddle-Row Plows or Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The especial object of the invention is to make a straddle-row plow which may be drawn by two horses, each of which may walk in adjacent rows and throw the soil from an intermediate row of plants.

Figure 1 of the drawings is a perspective view of my invention; Fig. 2, a front elevation, and Fig. 3 a rear elevation.

In the drawings, A A represent two turn-plows, connecting with the beams B B and handles C C in the usual or any suitable manner.

D D are two standards just over the rear of plows and bolted to the outside of beams. They are connected by eyebolts and hooks $d\ d'$ with a cross-bar, E, having two or more holes, $e$, near each end. Thus the plows may be placed closer to or more remote from each other. In front of the beams and to the clips F, I attach the hooks $f$, to which are attached the brace-hooks G and the hooks $h$ of the V-plates H.

I I' are two plates twice bent to a right angle at the points $i\ i$, and provided at each end with two or more holes, $i'\ i'$, to receive a draft-hook, J. At the top the plates I I' lap each other, and are connected by a bolt or key, K.

On the upper end of the plate I', I form a transverse upturned loop-guide, through which passes the upper end of plate I. This loop-guide $i^2$ prevents the plates from lateral displacement.

By my invention the plows are so connected together that corn may be easily and conveniently barred off at any stage of its growth, when it is advisable to do so.

Having thus described all that is necessary to a full understanding of my invention, what I claim as new, and desire to protect by Letters Patent, is—

The combination, with two beams connected adjustably over the plows and having the end clips, F, with hooks $f$, of the braces H, the interlapping angle-plates I, and the swiveled V-shaped plates G, carrying hooks $h$, as shown and described.

In testimony whereof I affix my signature in presence of two witnesses.

THOMAS LACKLIN.

Witnesses:
  J. J. DONEWAY,
  ED HOLDER.